Patented Apr. 30, 1940

2,199,187

UNITED STATES PATENT OFFICE 2,199,187

LUBE OIL ADDITION AGENTS

Raphael Rosen, Elizabeth, N. J., assignor to Standard Oil Development Company, a corporation of Delaware No Drawing. Application July 24, 1937,
Serial No. 155,433

10 Claims. (Cl. 87—9)

The present invention relates to improvements in wax modifying agents which may be used for depressing the pour point of waxy lubricating oil and as crystal growth regulators, for use in processes for dewaxing oils.

The present modifying agents are esters produced by the reaction of relatively long chain monohydric alcohols; that is to say alcohols having chains of at least 10 carbon atoms with cyclic acids. Among these acids may be mentioned, those of the type of benzoic, phthalic and its isomers, the tricarboxylic acids such as trimesic and trimellitic acids, the tetra and penta carboxylic acids such as pyro mellitic and prehnitic acid, and the hexacarboxylic or mellitic acid. In place of acids having simple cyclic groups, such as are mentioned above, may be used the corresponding acids with condensed aromatic rings such as the derivatives of naphthalene, anthracene and other members of this series. Acids possessing heterocyclic rings, in which oxygen, sulfur, nitrogen, etc. are an integral part of the rings, such as quinolinic acid ($\alpha$-$\beta$-pyridine dicarboxylic acid) and furan dicarboxylic acid may be used as well. It is generally preferred to use di or polycarboxylic acids and usually it is found that the acids with the higher number of carboxyl groups are preferable to those of the smaller number. Acids with short alkyl groups may be employed as well as hydro-aromatic acids corresponding to the various aromatic acids disclosed above. The esters may be prepared in any of the usual ways and may be made as relatively pure compounds or as mixtures. The amount of the alcohol used in proportion to the acid may vary considerably producing either a completely esterified material or a material containing free carboxyl groups.

The alcohols employed may be primary, for example produced by the hydrogenation or reduction of fatty acids such as stearic, oleic and the like, or they may be secondary such as produced by the treatment of high molecular olefins with sulfuric acid of a suitable strength so as to form alkyl sulfates which are subsequently hydrolyzed to produce the alcohol. Such secondary alcohols may be prepared advantageously from cracked or dehydrogenated hydrocarbons particularly cracked or dehydrogenated waxes derived from petroleum. These materials are sulfated just as indicated above and hydrolyzed to produce the secondary alcohols. Suitable alcohols may also be prepared by the direct oxidation of heavy hydrocarbons, for example direct oxidation with air under well known conditions. In this way, mixed oxidation products are produced containing a substantial amount of alcohol. The alcohols may be separated from the other ingredients and used as such or the mixtures of acids and alcohols may be treated as with hydrogen to produce an increased yield of mixed alcohols which are then employed for the production of the esters.

The esters disclosed above are used as pour point depressants in waxy oils in amounts of from say .1 to 2.0% more or less, some oils being more susceptible to the action of pour inhibitors than others and some esters being naturally more active than others.

When these esters are used as regulators of crystal growth in processes for removing wax from oil, the material is ordinarily added to the oil wax mixture which is diluted with suitable diluent such as naphtha or other well known wax precipitants, especially lower alcohols, ketones and the like. The mixtures are chilled to solidify the wax which is precipitated in a condition particularly suited for removal by mechanical methods such as filtration or centrifugation. The amount of the wax modifier used in such processes is substantially the same as for pour inhibiting and may vary considerably as indicated above.

The following examples may be considered to illustrate the operation of the invention:

Example I

Di-octa decyl phthalate was added to a waxy lubricating oil in proportion of about 2%. The original oil had a pour point of 30° F. which was reduced to 20° F. by the addition of the ester.

Example II

A trioctadecyl ester of mellitic acid was added to a waxy oil in amount of .2%. The pour point of the oil was reduced from 30° F. to 10° F. The amount of ester was then varied in different samples from .1 to .4% and it was found that the greatest depression with this particular oil and ester was obtained with .2% of the ester.

The wax modifying compounds disclosed above are valuable addition agents to lubricating oils not only for their pour depressing effect but also because they produce an increase in the oiliness of the compound. These materials may be used in combination with various other ingredients such as extreme pressure agents and the like.

The present invention is not to be limited by any theory of the mechanism of pour reduction or wax separation, but only by the following claims in which it is desired to claim all novelty inherent in the invention.

I claim:

1. A composition of matter comprising a waxy mineral lubricating oil and a small amount of an ester formed from a long chain aliphatic alcohol and a cyclic carboxylic acid.

2. A composition according to claim 1 in which the ester is formed from a cyclic acid containing a plurality of carboxylic groups.

3. A composition according to claim 1 in which the ester is formed from an aromatic carboxylic acid.

4. A composition according to claim 1 in which the ester is formed from an aromatic acid having at least two carboxyl groups.

5. A composition of matter comprising a waxy mineral lubricating oil and a small amount of an ester formed from a monohydric alcohol containing at least 10 carbon atoms and an aromatic carboxylic acid with at least two carboxyl groups.

6. A composition according to claim 5 in which the ester is formed from a phthalic acid.

7. A composition according to claim 5 in which the ester is octadecyl phthalate.

8. A composition according to claim 5 in which the ester is an octadecyl mellitate.

9. A composition of matter comprising a waxy lubricating oil and a small amount of an ester of a monohydric alcohol containing a chain of at least 10 carbon atoms and a heterocyclic carboxylic acd.

10. A composition according to claim 9 in which the heterocyclic acid is poly carboxylic and the ring contains an atom selected from the group consisting of sulphur, oxygen and nitrogen.

RAPHAEL ROSEN.